Figures 4, 9:
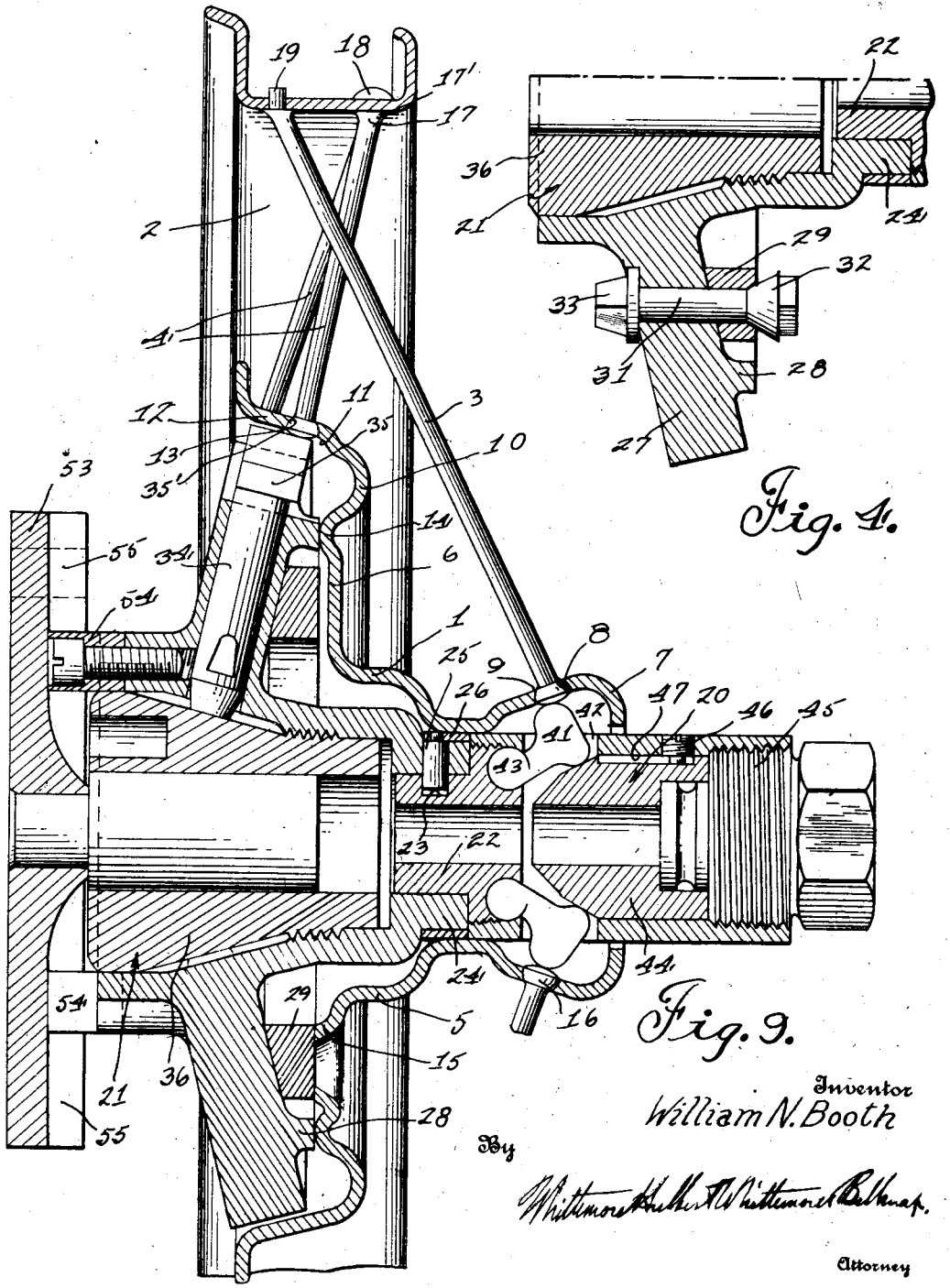

Feb. 26, 1929.
W. N. BOOTH
1,703,715
CHUCK
Filed April 18, 1927     3 Sheets-Sheet 1
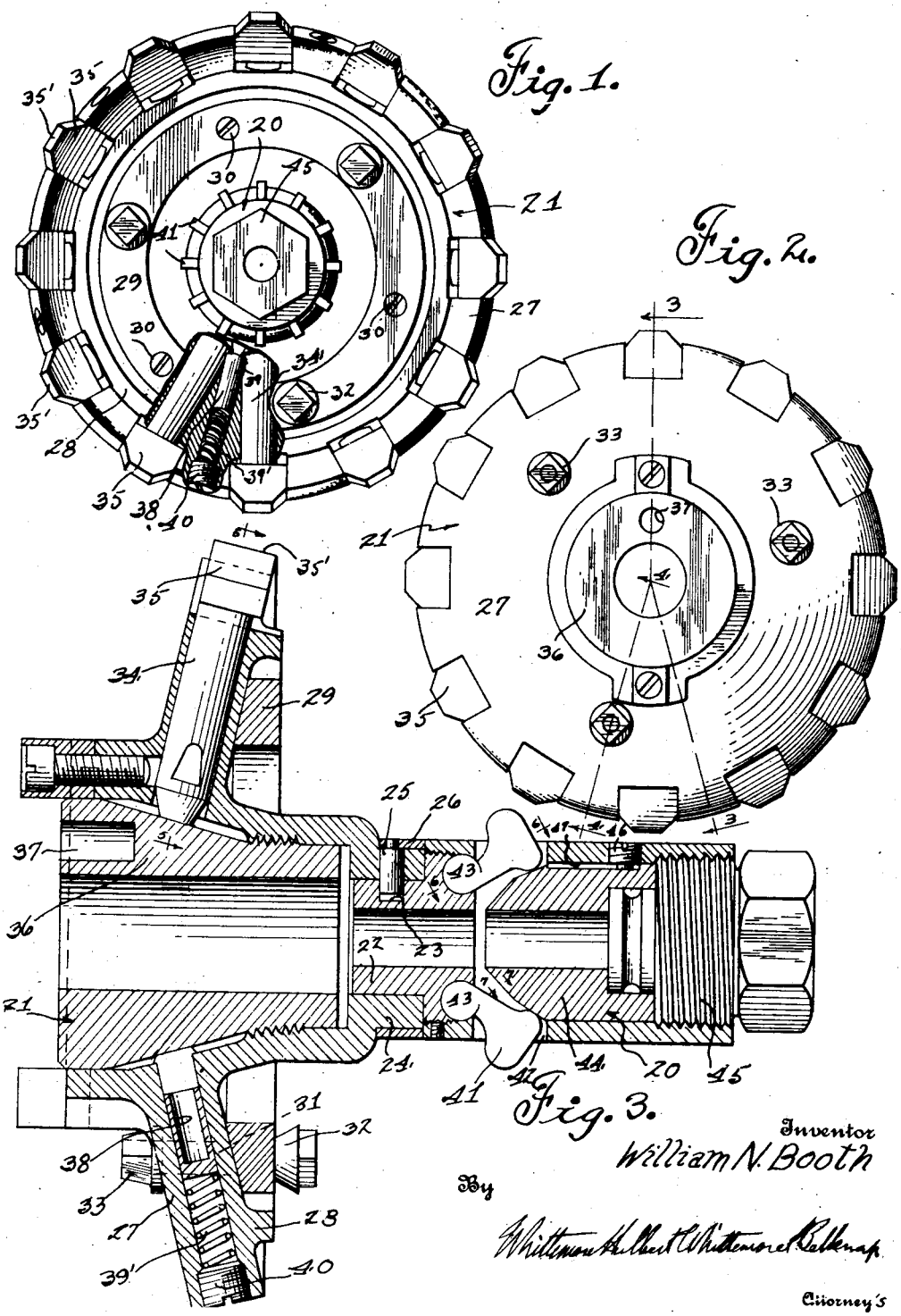
Inventor
William N. Booth
By
Whittemore, Hulbert, Whittemore & Belknap
Attorney's Feb. 26, 1929.  1,703,715
W. N. BOOTH
CHUCK
Filed April 18, 1927   3 Sheets-Sheet 2

Inventor
William N. Booth
By
Whitmore Belknap.
Attorney

Feb. 26, 1929.

W. N. BOOTH

CHUCK

Filed April 18, 1927    3 Sheets-Sheet 3

1,703,715

Inventor
William N. Booth
By
Attorneys

Patented Feb. 26, 1929.

1,703,715

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

CHUCK.

Application filed April 18, 1927. Serial No. 184,822.

The invention relates to chucks and refers more particularly to chucks for holding the spokes of vehicle wire wheels during the assembly of their parts. One of the objects of the invention is to so construct the chuck that it may be readily assembled with the hub shell of a vehicle wire wheel. Another object is to construct the chuck of body sections which may be readily secured to or detached from each other. Further objects of the invention reside in the novel features of construction and combinations and arrangements of parts as more fully hereinafter set forth.

In the drawings:—

Figure 8:
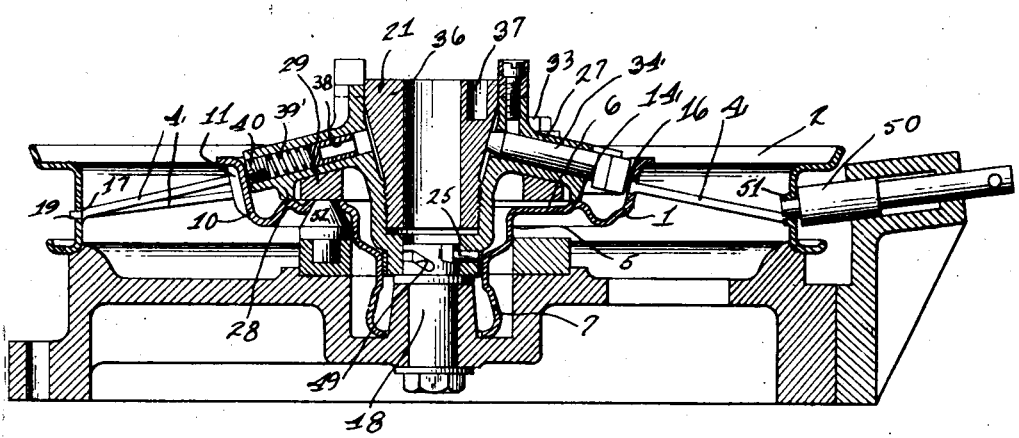
Figure 5:
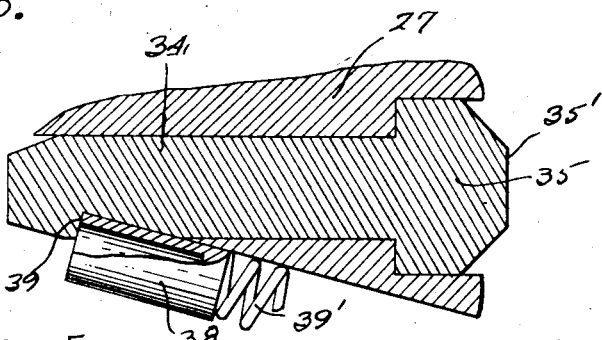
Figure 6:
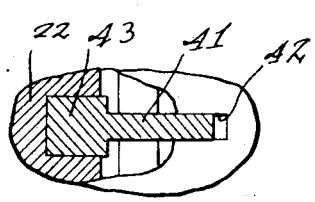
Figure 7:
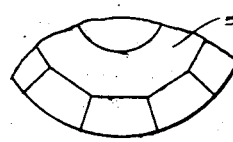

Figures 1 and 2 are front and rear elevations respectively of a chuck embodying my invention;

Figures 3 and 4 are cross sections respectively on the lines 3—3 and 4—4 of Figure 2;

Figures 5, 6 and 7 are cross sections respectively on the lines 5—5, 6—6 and 7—7 of Figure 3;

Figures 8 and 9 are sectional views showing manner of using the chuck.

The chuck embodying my invention is designed particularly for use during the assembly of the parts of a vehicle wire wheel. The wire wheel in the present instance and as illustrated in Figure 9 has the sheet metal hub shell 1, the rim 2 which is in the nature of a metallic channel shaped felly and the front and rear sets of spokes 3 and 4 respectively. The hub shell 1 has the barrel portion 5 and the radially extending flange portion 6. The front end of the barrel portion is provided with the annular bead 7 having the bosses 8 with spoke openings therethrough countersunk from the inner side thereof to form the spoke engaging seats 9. The flange portion is provided at its outer edge with the annular portion 10 having the bosses 11, the arcuate side walls 12 of which have spoke openings therethrough countersunk from the inner side thereof to form the hemispherical spoke engaging seats 13. The flange portion is further provided with the annular rib 14 and the inwardly located transverse tubular driving projections 15 which are preferably tapered. The inner ends of both the front and rear sets of spokes are provided with hemispherical heads 16 for engaging the hemispherical seats 9 and 13 and the outer ends of these spokes are provided with the enlargements 17 formed with hemispherical shoulders 17' for engaging the inner face of the rim, these shoulders being secured thereagainst by the heads 18 upon the spoke tenons 19 and peened against the outer face of the rim.

The chuck is designed to clamp the spoke head 16 against the seats 9 and 13 formed in the hub shell while various assembly operations are being performed upon the wire wheel including riveting over the tenons 19 at the outer ends of the spokes to form the heads 18. The chuck comprises the front and rear body sections 20 and 21 respectively which are adapted to be detachably secured to each other in predetermined relation and which also carry means engageable with the heads 15 of the front and rear spokes respectively to clamp the latter against their seats. For detachably securing the body sections together the front body section has the reduced rear end 22 which is provided with the diametrically opposite bayonet slots 23 in its outer face and leading from its end and the rear body section has the reduced front end 24 telescopically engaging or sleeved over the reduced rear end 22 and provided with the transverse pin 25 for alternatively engaging in one of the bayonet slots. For securing the pin in place I have provided the ring 26 surrounding the reduced front end 24 and having a diameter equal to the diameter of the front body section 21 for fitting the inner diameter of the reduced part of the barrel portion 5 of the hub shell.

The rear body section 21 is formed with the outwardly extending annular flange 27, the outer face of which terminates adjacent to the annular portion 10 of the flange portion 6. This outwardly extending annular flange is formed on its front face with the annular projection 28 for engaging the rear face of the annular rib 14 of the flange portion 6. This outwardly extending annular flange is also provided on its front face with the abutment ring 29 which is secured to the flange by suitable means such as the screws 30. This abutment ring is adapted to abut the rear ends of the tubular projections 15 to hold the hub shell from becoming distorted while clamped in the chuck. 31 are bolts extending through the outwardly extending annular flange 27, the abutment ring 29 and certain of the tubular projections 15 of the radially extending flange portion 6 at equiangular distances apart, these bolts having the tapered heads 32 for engaging the inner faces of the tubular projections. 33 are nuts threaded upon the bolts 31 and abutting the rear face of the outwardly extending annular projection 27. These nuts upon being tightened upon their bolts operate to clamp the rear body section of the chuck to the hub shell.

For the purpose of clamping the heads 16 of the rear spokes 4 against their seats 13, I have provided the plungers 34 which are slidably mounted in the outwardly extending annular flange 27 to move longitudinally and outwardly relative to the rear body section. These plungers have at their outer ends the heads 35 which are provided with the noses 35′ having inclined sides for adapting the heads for engagement within the bosses 11 upon the annular portion 10, the inclined sides of each nose being adapted to engage the heads of the spokes extending through each boss. 36 is an actuating screw for forcing the plungers outward, this screw having a front end portion threadedly engageable with the interior of the rear body section 21 and a rear beveled end portion for contacting with the inner ends of the plungers. This screw is adapted to be rotated by suitable means such as a spanner wrench having prongs engageable in suitable bores 37 in the rear end of the screw. For resiliently returning the plungers to their inward positions, I have provided the second plungers 38 longitudinally slidable inward and outward relative to the rear body section and located between adjacent plungers 34. Each plunger 38 is engageable with shoulders 39 formed in the sides of the adjacent plungers 34 and each plunger 38 is resiliently forced inwardly by the coil spring 39′, the outer end of which abuts the plug 40. The arrangement is such that the number of second plungers and coil springs for actuating the same to resiliently return the spoke engaging plungers is one half the number of the latter.

The front body section 20 of the chuck has mounted thereupon the pivotal levers 41 which are adapted to swing in radial planes through the openings 42 formed in the front body section. Each lever 41 has the cylindrical head 43 which is pivotally secured to the front body section by cooperating members of the front body section threadedly engaging each other, one of these members forming the reduced rear end 22 and the other member forming part of the bearing for engaging the reduced part of the barrel portion of the hub shell. For actuating the levers to force the same outwardly into engagement with the heads 16 of the front spokes 3 to clamp these heads in their seats 9, I have formed the actuating plug 44 which is longitudinally slidably mounted within the front body section 20 and has a tapered nose engageable with the levers 41. I have also provided the screw 45 which is threaded within the front body section 20 and is suitably secured to the front end of the plug 44. The nose of the plug 44 is preferably frusto-pyramidal in shape providing a plane bearing face for each lever. To hold the plug from rotation relative to the front body section, I have mounted upon the front body section the plug 46 which is engageable with the longitudinally extending slot 47 in the outer face of the plug 44. The mounting of the levers 41 upon the front body section and the location of either bayonet slot 23 in the front body section, as well as the mounting of the plungers 34 and the pin 25 upon the rear body section are such that when these two sections are secured to each other by engaging the pin with either of the bayonet slots the position of the parts when the two sections are finally secured is predetermined so that the plungers and the levers will properly engage the heads of the spokes.

As shown in Figure 8, the rear body section 21 of the chuck is first used independently of the front body section 20. The pin 25 used in securing the body sections to each other is used in securing this rear body section to the fixture, the fixture having an axial pilot 48 of a diameter to receive the reduced front end 24 of the rear body section and provided with diametrically opposite bayonet slots 49 for alternatively receiving the pin 25. This fixture is constructed to peripherally position the hub shell 1 and the rim 2 relative to each other and as shown has the plunger 50 for engaging the valve stem hole 51 in the rim and the tapered buttons 52 for engaging certain of the tubular projections 15 of the hub shell at equiangular distances apart.

As shown in Figure 9, both body sections 20 and 21 are used, at which time the rear body section 21 is supported upon the base 53 of another fixture and held from rotation by the positioning projections 54 extending at diametrically opposite points from the rear body section beyond its rear end and engaging in aligned slots 55 in the base. By reason of these positioning projections the front body section may be first rotated to engage the pin 25 in one of the bayonet slots 23 and then the screw 45 may be rotated to move the levers 41 outward without the necessity of manually holding the rear hub section from rotation.

In operation, the hub shell 1 and rim 2 may be placed upon the fixture having the pilot 48 and peripherally positioned relative to each other. Then the rear set of spokes 4 may be passed outwardly through the openings in the bosses 11 upon the hub shell and their tenons inserted in the proper openings in the rim. The rear body section may then be secured upon the fixture by engaging its pin 25 with one of the bayonet slots 49 after which the nuts 35 are tightened upon the bolts 31 to clamp the hub shell to the rear body section. Then by tightening up of the actuating screw 36 the plungers 34 may be forced outwardly to clamp the heads 16 of the rear set of spokes firmly against their seats. The partially assembled wheel with the rear body section of the chuck may then be removed from the fixture and placed in suitable riveting apparatus for forming the heads 18 upon the tenons 19, the positioning projections 54 upon the rear body section being used at this time for driving the partially assembled wheel during the indexing operation of the machine. After the rear set of spokes have been riveted, the rear body section is then placed upon the base 53 of the second fixture and the front set of spokes 3 are passed outwardly through the openings formed in the bosses 8 of the hub shell and engaged with the proper openings in the rim. The front body section may then be secured to the rear body section and its actuating screw 45 rotated to move its levers 41 outwardly to force the heads 16 upon the front set of spokes firmly against their seats. The wheel with the complete chuck is then removed and placed in a suitable machine for riveting the tenons of the front set of spokes, at which time the positioning projections are again used during the indexing of the machine.

What I claim as my invention is:

1. A chuck for holding the spokes of a wire wheel including a body insertable within the hub shell of the wheel, and means carried by said body and engageable with the spokes to hold the same in position relative to the hub shell.

2. A chuck for holding the spokes of a wire wheel including a body insertable within the hub shell of the wheel, and means carried by said body and engageable with heads upon the spokes for clamping the heads against the hub shell.

3. A chuck for holding the spokes of a wire wheel including a body insertable within the hub shell of the wheel, and means carried by said body and movable outwardly relative thereto into engagement with heads upon the spokes for clamping the heads against the hub shell.

4. A chuck for holding the spokes of a wire wheel including a body insertable within the hub shell of the wheel, means carried by said body and movable outwardly relative thereto into engagement with heads upon the spokes for clamping the heads against the hub shell, and means upon said body for moving said clamping means outward.

5. A chuck for holding the spokes of a wire wheel including a body insertable within the hub shell of the wheel, plungers carried by said body and movable outwardly relative thereto into engagement with heads upon the spokes for clamping the heads against the hub shell, and means within said body and adjustable to move said plungers outwardly.

6. A chuck for holding the spokes of a wire wheel including a body insertable within the hub shell of the wheel, plungers carried by said body and movable outwardly relative thereto into engagement with heads upon the spokes for clamping the heads against the hub shell, and an actuating screw threadedly engaging said body for moving said plungers outward.

7. A chuck for holding the spokes of a wire wheel including a body insertable within the hub shell of the wheel, pivotal levers upon said body and movable outwardly relative thereto into engagement with heads upon the spokes for clamping the heads against the hub shell, and means upon said body for moving said levers outward.

8. A chuck for holding the spokes of a wire wheel including a body insertable within the hub shell of the wheel, pivotal levers upon said body movable outwardly relative thereto into engagement with heads upon the spokes for clamping the heads against the hub shell, and means movable longitudinally within said body and engageable with said levers to move the same outward.

9. A chuck for holding the spokes of a wire wheel including a body insertable within the hub shell of the wheel, means for securing said body in predetermined relation to the hub shell, and means carried by said body and engageable with the spokes to hold the same in predetermined relation to the hub shell.

10. A chuck for holding the spokes of a wire wheel having a hub shell formed with a radially extending flange portion with transverse tubular projections, said chuck including a body insertable within the hub shell of the wheel, means upon said body for engagement with the tubular projections to secure said body to the hub shell, means upon said body for abutting the tubular projections, and means carried by said body and engageable with heads upon the spokes for clamping the heads against the hub shell.

11. A chuck for holding the spokes of a wire wheel including a body section insertable within the hub shell of the wheel, plungers longitudinally movable outwardly relative to said body into engagement with heads upon the spokes for clamping the heads against the hub shell, means for resiliently moving said plungers inwardly including a spring operating upon a pair of plungers, and means carried by said body and adjustable to move said plungers outward.

12. A chuck for holding the spokes of a wire wheel including a body section insertable within the hub shell of the wheel, and means carried by said body section and engageable with certain of the spokes to hold the same in position relative to the hub shell, a second body section detachably secured to said first mentioned body section, and means carried by said second body section and engageable with certain of the spokes to hold the same in position relative to the hub shell.

13. A chuck for holding the spokes of a wire wheel including a body section insertable within the hub shell of the wheel, and means carried by said body section and engageable with certain of the spokes to hold the same in position relative to the hub shell, a second body section detachably secured to said first mentioned body section and means carried by said second body section and engageable with certain of the spokes to hold the same in position relative to the hub shell, and means for securing said body sections in predetermined relation to each other.

14. A chuck for holding the spokes of a wire wheel including a body section insertable within the hub shell of the wheel, and means carried by said body section and engageable with heads upon certain of the spokes for clamping the heads against the hub shell, a second body section telescopically engaging said first mentioned body section and means carried by said second body section and engageable with heads upon certain of the spokes for clamping the heads against the hub shell, and means for detachably securing said body sections to each other, including a pin upon one engaging in a bayonet slot in the other.

15. A chuck for holding the spokes of a wire wheel including a body engageable with the hub shell of the wheel, means carried by said body and engageable with the spokes to hold the same in position relative to the hub shell, and positioning means upon said body including a projection extending laterally beyond an end thereof.

16. A chuck for holding the spokes of a wire wheel including a body section insertable within the hub section of the wheel, and means carried by said body section and engageable with heads upon certain of the spokes for clamping the heads against the hub shell, a second body section detachably secured to said first mentioned body section, and means carried by said second body section and engageable with heads upon certain of the spokes for clamping these heads against the hub shell.

17. A chuck for holding the spokes of a wire wheel including a body section insertable within the hub shell of the wheel, and means carried by said body section and engageable with heads upon certain of the spokes for clamping the heads against the hub shell, a second body section detachably secured to said first mentioned body section, and means carried by said second body section and engageable with heads upon certain of the spokes for clamping these heads against the hub shell, and means for securing said body sections in predetermined relation to each other.

18. A chuck for holding the spokes of a wire wheel having a hub shell formed with a radially extending flange portion with transverse projections, said chuck including a body insertable within the hub shell, means cooperating with the projections for positioning the hub shell relative to said body, and means carried by said body and engageable with the spokes for holding the same in position relative to the hub shell.

19. A chuck for holding the spokes of a wire wheel including a member attachable to the hub section of the wheel, and means carried by said member and engageable with the spokes to hold the same in position relative to the hub section.

20. A chuck for holding the spokes of a wire wheel including a member attachable to the hub section of the wheel, and means mounted upon said member and adjustable into engagement with the heads upon the spokes to hold the heads in position relative to the hub section.

In testimony whereof I affix my signature.

WILLIAM N. BOOTH.